United States Patent [19]
Fabbrizio et al.

[11] Patent Number: 6,041,321
[45] Date of Patent: Mar. 21, 2000

[54] ELECTRONIC DEVICE FOR PERFORMING CONVOLUTION OPERATIONS

[75] Inventors: Vito Fabbrizio, Piacenza, Italy; Alan Kramer, Berkeley, Calif.

[73] Assignee: SGS-Thomson Microelectronics S.r.l., Agrate Brianza, Italy

[21] Appl. No.: 08/953,956

[22] Filed: Oct. 10, 1997

[30] Foreign Application Priority Data

Oct. 15, 1996 [EP] European Pat. Off. ............... 96830525

[51] Int. Cl.$^7$ ..................................................... G06F 15/18
[52] U.S. Cl. ............................ 706/41; 382/157; 382/156
[58] Field of Search ....................... 706/25, 41; 382/101; 326/35

[56] References Cited

U.S. PATENT DOCUMENTS

| | | |
|---|---|---|
| 4,904,881 | 2/1990 | Castro . |
| 5,014,235 | 5/1991 | Morton .................................... 364/900 |

FOREIGN PATENT DOCUMENTS

| | | | |
|---|---|---|---|
| 0349007 A2 | 3/1990 | European Pat. Off. ......... | G06G 7/60 |
| 3612963 A1 | 10/1987 | Germany .......................... | G06K 9/62 |

OTHER PUBLICATIONS

A pipeland ASIC for color matrixing and convolution; Hsu, K.; D'Luna, L.J.; Yeh, H.; Cook, W.A.; Brown G.W.; ASIC Seminar and Exhibit, 1990. Proceedings., Third Annual IEEE; 1990, Pages(s): P7/6.1 –P7/6.6, 1990.

Jackel et al., From Pixels to Features II. Parallelism in Image Processing, Proceedings of a Workshop, Bonas, France, Aug. 27 –Sep. 1, 1990, pp. 215–228, "Hardware Considerations for Neural–Net Character Recognition Systems".

Graf et al., Neural Networks from Models to Applications, Paris, France, Jun. 6–9, 1988, pp. 725–732 "VLSI Neural Network for Fast Pattern Matching".

*Primary Examiner*—Tariq R. Hafiz
*Assistant Examiner*—Edward G. Brown
*Attorney, Agent, or Firm*—Theodore E. Galanthay; Allen, Dyer, Doppelt, Milbrath & Gilchrist, P.A.

[57] ABSTRACT

An electronic device for performing convolution operations comprises shift registers for receiving binary input values representative of an original matrix, synapses for storing weights correlated with a mask matrix, and neurons for outputting a binary result dependent on the sum of the binary values weighted by the synapses. Each synapse has a conductance correlated with the weight stored and dependent upon the binary input value. Each neuron generates the binary result in dependence on the total conductance of the corresponding synapses.

28 Claims, 3 Drawing Sheets

ELECTRONIC DEVICE FOR PERFORMING CONVOLUTION OPERATIONS

FIELD OF THE INVENTION

The present invention relates to an electronic device for performing convolution operations and, in particular, to an electronic device for performing a convolution operation between an original matrix and a mask matrix.

BACKGROUND OF THE INVENTION

The convolution of an original matrix with a mask (or kernel) matrix is an operation which associates with each element $I_{i,j}$ of the original matrix an element $C_{i,j}$ given by:

$$C_{i,j} = \sum_{h=-P}^{P} \sum_{k=-Q}^{Q} I_{i+h,j+k} \cdot K_{h,k}$$

in which $K_{h,k}$ are the elements of the mask, and $2 \cdot P+1$ and $2 \cdot Q+1$ are the number of lines and columns thereof, respectively. Convolution operations are used in various applications, such as image recognition, text analysis, character recognition, automatic steering of vehicles, and the like.

Convolution operations can be performed with the use of neural networks, for example. Neural networks are data-processing systems based on the nervous systems of living creatures. A neural network is composed of processing elements (neurons) connected to one another by connecting elements (synapses). The neurons and the synapses are based upon the corresponding biological elements so that they form a layout comparable to very simple nerve tissue.

Each neuron is represented by a node which receives input values $x_1$–$x_n$ (from other neurons or from input nodes of the neural network) through corresponding synapses. Each synapse transfers to the neuron a corresponding input value $x_i$ which is weighted, that is, multiplied by a suitable weight $w_i$. The neuron adds up the input values weighted by the synapses and outputs a result U (for transmission to other neurons or to an output node of the neural network) on the basis of an activation function f:

$$U = f(\Sigma w_i \cdot x_i)$$

In particular, in binary neural networks according to the McCulloch-Pitts model, the output U of each neuron can assume only two binary values, 0 and 1. The activation function f compares the sum of the weighted input values with a threshold value $V_{th}$ and determines the output U on the basis of the result of this comparison. For example, the output U will assume the value 1 if the sum of the weighted input values is greater than the threshold value $V_{th}$, otherwise it will assume the value 0. The convolution operation is performed by the storage, in the synapses, of weights correlated with the mask matrix, and the supply of values representative of the original matrix as inputs to the neural network, for example, by means of a set of shift registers.

Various approaches, particularly analog approaches, are known for the production of electronic devices for performing convolution operations as described, for example, in "A Reconfigurable CMOS Neural Network", H. P. Graf, D. Henderson—ISSCC Digest of Technical Papers, pp. 144–145, February 1990. A disadvantage of known electronic devices is that they impose significant limitations on the dimensions of the masks usable (typically 3 lines by 3 columns) in applications where a fast response rate is required (for example, in automatic steering systems for vehicles) since the large number of operations required by large masks reduces the speed of the device. Moreover, these devices are complex and take up a large area when produced in integrated circuit form, particularly with regard to the formation of the synapses.

SUMMARY OF THE INVENTION

In view of the foregoing background, it is therefore an object of the present invention to provide an electronic device for performing convolution operations that can operate on relatively large masks with relatively high speeds.

This and other objects, features and advantages are provided in accordance with the present invention by an electronic device comprising a plurality of shift registers each comprising a plurality of cells for receiving binary input values representative of the original matrix. The device also preferably includes a matrix of synapses having a plurality of columns and at least one line for storing weights correlated with the mask matrix. The synapses of each column are preferably connected to a corresponding cell to receive the binary value contained in the cell as an input and to output a weighted value dependent upon the product of the binary value and the weight stored. Each synapse preferably has a substantially zero conductance for a first binary value and a conductance correlated with the weight stored for a second binary value. The device also includes at least one neuron connected to the synapses of a corresponding line to receive a sum of the weighted values of the synapses of the corresponding line as an input and to output a binary result dependent upon the sum. Each neuron, in turn, preferably comprises conductance-measurement means for generating the binary result in dependence on a total conductance of the synapses of the corresponding line.

Each synapse may comprise a positive synapse and a negative synapse which can store a positive weight and a negative weight, respectively. Accordingly, the conductance-measurement means may generate the binary result in dependence on a comparison between a total conductance of the positive synapses and a total conductance of the negative synapses of the corresponding line.

Each positive synapse and each negative synapse may comprises a memory cell. Each memory cell may have a first terminal, a second terminal, and a control terminal. The first terminal of each memory cell may be connected to a reference terminal, the control terminals of the memory cells of each column may be connected to the corresponding cells of the shift registers, and the second terminals of the memory cells providing the positive synapses and the negative synapses of each line are preferably connected to a first input line and to a second input line to the corresponding neuron, respectively. In addition, the total conductance of the positive synapses and of the negative synapses of the line may be substantially equal to the conductance of the first line and of the second line, respectively. Each memory cell may comprise a flash EEPROM memory cell including a floating-gate field-effect transistor having a threshold voltage correlated with the absolute value of the positive or negative weight stored, respectively.

The electronic device according to the present invention is accurate, fast, requires a low supply voltage, and has a limited power consumption and a simple and compact structure. In particular, the efficiency and dimensions of the structure are such that it can be used in portable systems. The electronic device of the present invention is suitable for use with large masks by virtue of the low consumption per operation and of its speed. It also permits a high degree of parallelism for the operations. The use of inputs in digital form makes the device quicker and more accurate and reliable and requires no digital/analog conversion unit.

BRIEF DESCRIPTION OF THE DRAWINGS

Further characteristics and advantages of the electronic device according to the present invention will become clear from the following description of a preferred embodiment thereof, given by way of non-limiting example, with reference to the appended drawings, in which.

DETAILED DESCRIPTION OF THE PREFERRED EMBODIMENT

Figure 1:
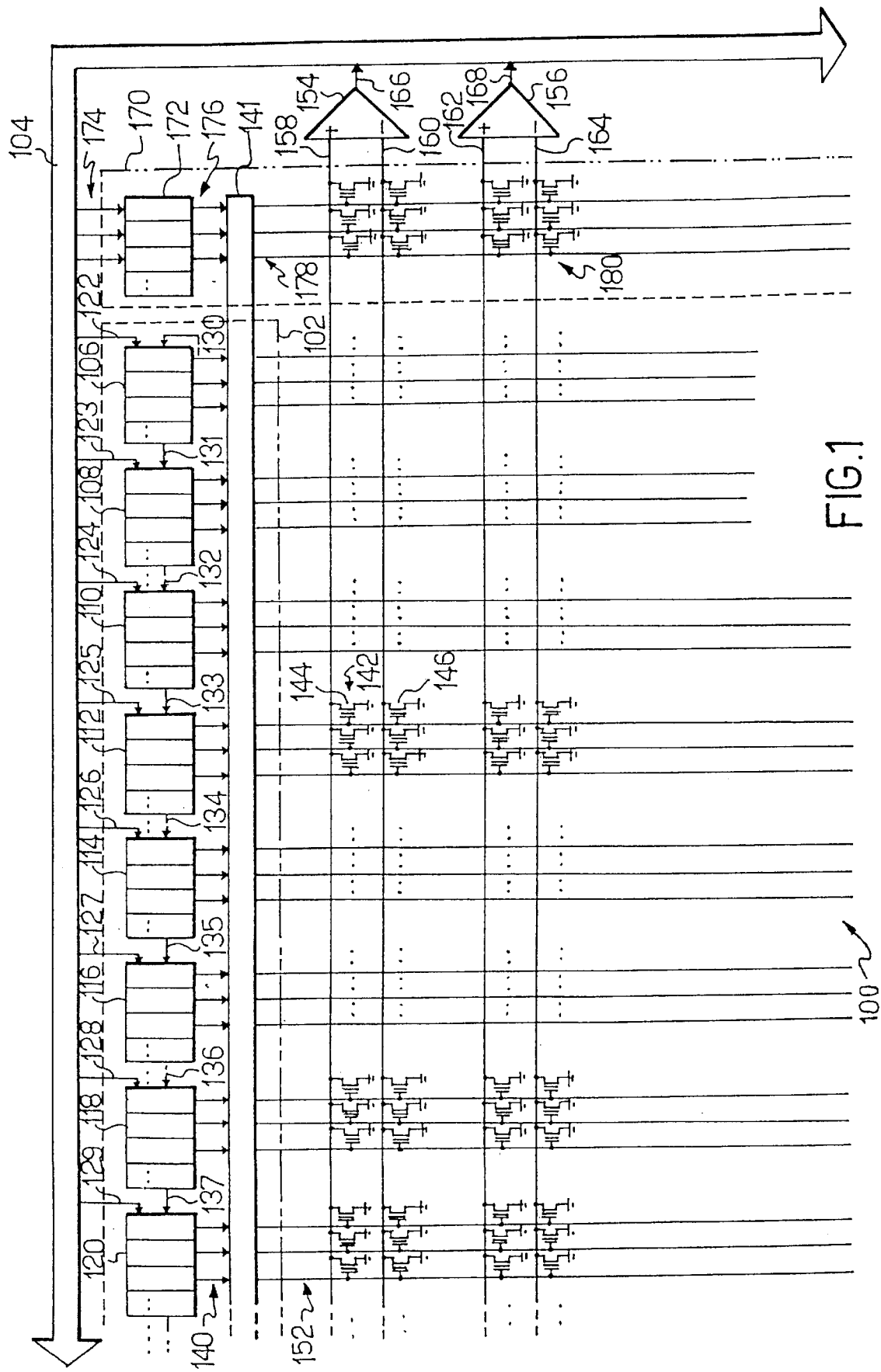
FIG. 1 is a diagram illustrating the concept of an electronic device according to the present invention.

With reference now to the drawings and, in particular, with reference to FIG. 1, an electronic device 100 according to the present invention comprises an input unit 102 connected to a bus 104, for example, with 64 lines for receiving binary values or bits (0–1) representative of an original matrix. The digital value 1 is commonly represented by a positive supply voltage value Vdd (for example, 5V relative to a reference value or ground), whereas the digital value 0 is typically represented by a voltage value of 0V. The input unit 102 is illustratively provided by a plurality of shift registers 106–120, the number of registers typically being the same as the number of lines of the bus 104 (64 in the example in question, of which only 8 are shown in the drawing).

Each shift register 106–120 is provided by a plurality of cells connected to one another in conventional manner. The first cell of each shift register 106–120, which is indicated as the cell for the least significant bit (or LSB), is connected to a corresponding line of the bus 104 by means of a line 122–129 to receive the binary input value present on the corresponding line of the bus 104. The insertion of this binary value causes a shift of the binary values held in the shift register 106–120 towards the left-hand side in the drawing.

Advantageously, the last cell of each shift register 106–120, which is indicated as the cell for the most significant bit (or MSB), is connected to the first cell of the next shift register by means of a line 130–137. The last cell of the last shift register is connected to the first cell of the first shift register. The last cell of each shift register 106–120 can also be connected to the first cell of the preceding shift register by means of a further line, not shown in the drawing. A suitable configuration block (not shown in the drawing) contained within each shift register 106–120 enables a specific input (from the bus 104, or from the preceding or subsequent shift register) so that the binary values can be loaded therein. The length and number of shift registers of the device can thus be varied dynamically in dependence upon the various requirements of use.

The shift registers 106–120 are preferably connected, by means of lines 140, to a translator block 141 which transforms the voltage levels associated with the binary values contained in each cell of the shift registers 106–120. In particular, a voltage value Vl (for example, 2V) is associated with the binary value 0, whereas a voltage value Vh greater than Vl (for example, 3V) is associated with the binary value 1. The voltage values Vl, Vh used can advantageously be modified so as to adapt the operation of the device to the various dynamic ranges and precision desired.

The binary values loaded into the input unit 102 are supplied to a matrix of synapses in which weights correlated with a mask matrix are stored. Each synapse, for example, the synapse 142 shown in the drawing, advantageously comprises a positive synapse 144 and a negative synapse 146 for storing a positive weight and a negative weight, respectively. Those of skill in the art will appreciate, however, that the present invention can alternatively be implemented with the use of only one type of synapse. The synapses of each column are connected to the same line 152 and, hence, by means of the translator block 141, to the same cell of the shift registers 106–120 to receive as an input the binary value contained in the cell and suitably transformed by the translator block 141.

The synapses of each line are connected to a corresponding neuron 154, 156. In particular, the positive synapses and the negative synapses of each line are connected to respective lines 158, 162 and to respective lines 160, 164 for input to the corresponding neurons 154, 156. Each positive or negative synapse is provided by a memory cell which forms a switching element with programmable conductance, as described in European patent application No. 95830433.9 of Oct. 13, 1995.

In particular, when the synapse receives an input value corresponding to logic level 0 (Vl), the switch is opened so that its conductance is zero. When the input has a value corresponding to logic level 1 (Vh), the switch is closed and its conductance is equal to a value stored therein. The switch is preferably provided by a floating-gate field-effect transistor (MOSFET) and, in particular, by a cell of a flash EEPROM (or $E^2$PROM) memory. Alternatively, the switch may be provided by a dynamic floating-gate element or by a fixed-weight element (for example, a transistor in which the weight is correlated with its size).

The source terminals of the transistors 144, 146 are connected to a reference terminal (ground). The gate terminals of the transistors 144, 146 of each column are connected to the same line 152. The drain terminals of the transistors providing the positive synapses 144 and the negative synapses 146 of each line are connected to the corresponding lines 158, 162 and 160, 162, respectively. Each transistor 144, 146 is programmed so as to have a threshold voltage (Vt) correlated with the absolute value of the weight stored.

In particular, a zero weight is associated with a threshold voltage Vt greater than the voltage Vh so that the transistor 144, 146 is always cut off (conductance zero) irrespective of the voltage applied to its gate terminal (Vl, Vh), that is, of the input logic value (0, 1). Weights other than zero are associated with a threshold voltage Vt between Vl and Vh. For example, the weight 1 (as an absolute value) is associated with the voltage Vt=2.5V, the weight ½ with the voltage Vt=2.5V+256 mV=2.756V, the weight ¼ with the voltage Vt=2.5V+256 mV+128 mV=2.884V, and so on. Typically, the weight with the lowest absolute value stored in the transistors 144, 146 is associated with a threshold voltage below the voltage Vh by a predetermined value (for example 32 mV).

When the voltage on the line 152 has a value Vl (logic level 0) the transistor 144, 146 is cut off (conductance zero). When the voltage on the line 152 has the value Vh (logic level 1), the conductance of the transistor 144, 146 is proportional to the difference between the voltage Vh and the threshold voltage Vt. The conductance of each transistor 144, 146 is consequently correlated with the product of the binary value input and the weight stored. The total conductance of each line 158, 162 is correlated with the sum of the products of the inputs and the positive weights stored, whereas the total conductance of each line 160, 164 is correlated with the sum of the products of the inputs and the negative weights stored.

Each neuron 154, 156 measures the total conductance of the synapses of the corresponding line and calculates a binary result dependent on this measurement. In particular, the neuron 154, 156 compares the total conductance of the positive synapses with the total conductance of the negative synapses of the corresponding line and produces the binary result in dependence on this comparison, for example, 1 if the total conductance of the negative synapses is greater than the total conductance of the positive synapses or, otherwise, 0. The neurons 154, 156 are connected to the bus 104 by means of lines 166, 168 to output these binary results. If the number T of neurons (for example 256) is greater than the number of lines of the bus 104, the neurons are connected to the bus 104 by means of a suitable multiplexer, not shown in the drawing.

In the preferred embodiment shown in the drawing, the device 100 also comprises an unbalancing block 170 which enables the total conductance of the positive and negative synapses of each line to be varied in a predetermined manner. In particular, the unbalancing block 170 comprises, for example, 64 memory (latch) elements 172, connected to the bus 104 by means of lines 174 to receive enabling binary input values. Each memory element 172 is connected to the translator block 141 by means of lines 176. The binary values contained in the memory elements 172 are supplied to a matrix of floating-gate field-effect transistors 180 suitably programmed in a manner similar to that described above.

The transistors 180 of each column are connected to the same line 176 and, hence, by means of the translator block 141 to the same memory element 172 to receive as inputs, the binary value contained in the memory element 172, suitably transformed by the translator block 141. The transistors 180 of the same line are connected to a corresponding one of the lines 158, 164.

When a transistor 180 receives an input value corresponding to logic value 0 (Vl), its conductance is always zero so that it does not affect the total conductance of the line 158–164 to which it is connected. When a transistor 180 receives an input value corresponding to logic value 1 (Vh), its conductance is proportional to the difference between the voltage Vh and the threshold voltage Vt. By suitable programming of the transistors 180 and of the values contained in the memory elements 172, it is thus possible to obtain different output results for the same binary values input and the same weights stored. For example, if the total conductance of the positive synapses in a line is increased by a value ΔG (the threshold value of the neuron) relative to the total conductance of the negative synapses, the result output by the corresponding neuron 154, 156 will be 1 only if the conductance correlated with the sum of the products of the input values and the negative weights exceeds the conductance correlated with the sum of the products of the input values and the positive weights by a quantity at least equal to the threshold ΔG.

Moreover, this characteristic enables multi-bit results to be obtained by the programming of equal weights on lines of synapses connected to neurons with different thresholds, or by alteration of the values in the memory elements 172 in successive computation cycles with the same input values. It should be noted that these multi-bit outputs cannot assume the values of all possible binary combinations. In fact, if a generic neuron has its output at 1, then all of the neurons with lower thresholds will have their outputs at 1. For example, if two neurons are considered, the possible output configurations will be solely 00, 01, 11.

These outputs are transformed into corresponding digital values, for example, by means of a suitable conversion block, (not shown in the drawing) connected between the neurons 154, 156 and the bus 104. The unbalancing block 170 described above enables various activation functions to be implemented, such as sigmoid or hyperbolic tangent functions and enables multi-bit binary outputs to be obtained.

Figure 2:
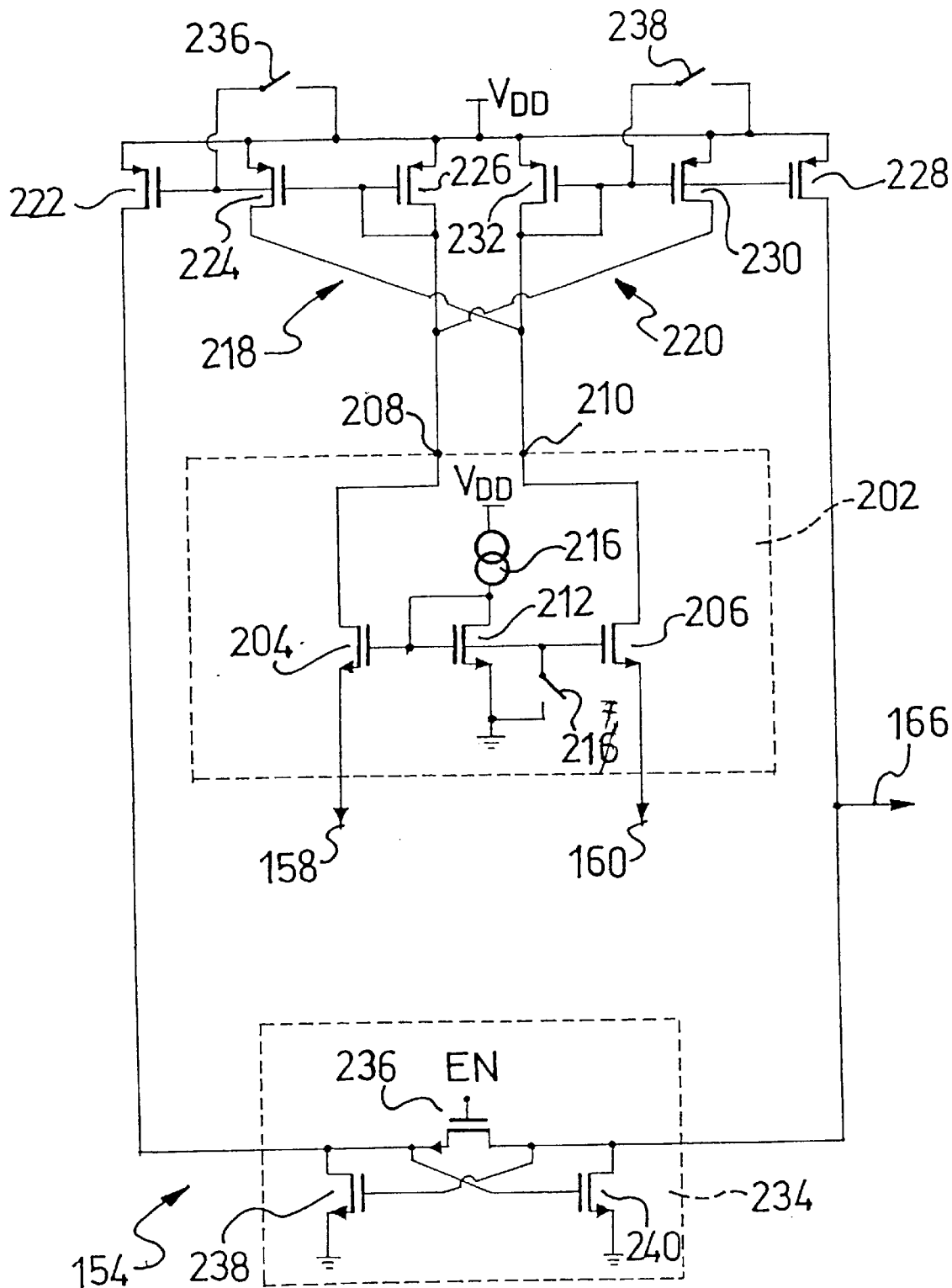
FIG. 2 is a circuit diagram of a neuron used in the device of the present invention.

With reference now to FIG. 2, this is a circuit diagram of a neuron 154 used in the electronic device of the present invention (elements in common with FIG. 1 are identified by the same reference numerals). This structure is described in greater detail in European patent application No. 95830433.9 cited above. The neuron 154 receives as inputs the total conductance of the positive and negative synapses of the corresponding line by means of the line 158 and the line 160, respectively. The lines 158 and 160 are connected to a decoupling stage (a buffer) 202, comprising two N-channel MOS transistors (NMOS) 204 and 206 the gate terminals of which are connected to one another. The source terminals of the transistors 204 and 206 are connected to the lines 158 and 160, respectively, whereas their drain terminals define respective output lines 208 and 210 of the decoupling stage 202.

The stage 202 comprises another NMOS transistor 212 connected as a diode with its drain terminal connected to a positive supply terminal Vdd by means of a current generator 216. The gate terminal of the transistor 212 is connected to its own drain terminal and to the gate terminals of the transistors 204 and 206, whereas its source terminal is connected to the earth terminal. An electronic switch 217 is connected between the gate terminals of the transistors 204, 206, 212 and the earth terminal. When the switch is closed, the transistors 204, 206, 212 are cut off so as to eliminate the current in the corresponding synapses when the device is not in use. The switch 217, in addition to a further switch (not shown in the drawing), in series with the current generator 216, advantageously permits selective activation solely of the neurons actually used in a certain computation cycle, thus reducing the power consumption of the device.

The decoupling stage 202 enables the capacitance affecting the lines 208 and 210 to be solely that defined by the transistors 204 and 206 and not the total capacitance of the transistors in parallel constituting the corresponding synapses which, in view of the very large number of synapses which are generally present (up to a few thousand) may be extremely high. This makes the operation of the neuron 154 very quick, on the order of a thousand GCPS (giga connections per second). The decoupling stage 202 also keeps a low voltage level on the lines 158 and 160 so that the entire device can operate with a low supply voltage level (on the order of a few V) and a low power consumption per operation (on the order of some tens of GCPS/mW at the maximum computation speed).

The neuron 154 comprises two symmetrical portions 218 and 220 connected to one another and to the lines 208 and 210. Each of the portions 218 and 220 comprises three P-channel MOS transistors (PMOS) 222–226 and 228–232, respectively, of which the source terminals are connected to the supply terminal Vdd and the gate terminals are connected to one another. The transistors 226 and 232 are connected as diodes, forming current mirrors with the transistors 222, 224 and 228, 230, respectively, and their drain terminals are connected to the lines 208 and 210, respectively. The drain terminals of the transistors 224 and 230 are connected to the lines 210 and 208, respectively.

The drain terminals of the transistors 222 and 228 are connected to a latch circuit 234. Two electronic switches 236 and 238 are connected between the supply terminal Vdd and the gate terminals of the transistors 222–226 and 228–232, respectively. When the device is not in use, these switches are closed to keep the transistors 222–232 cut off.

The latch circuit 234 comprises an NMOS transistor 236 the source terminal and the drain terminal of which are connected to the drain terminals of the transistors 222 and 228, respectively. Its gate terminal forms a control input for an enabling signal EN. The latch circuit 234 comprises two further NMOS transistors 238 and 240 of which the drain terminals are connected to the source and drain terminals of the transistor 236, respectively, the gate terminals are connected to the drain and source terminals of the same transistor 236, respectively, and the source terminals are connected to ground. The drain terminal of the transistor 240 defines the output line 166 of the neuron 154.

The neuron 154 compares the conductances of the lines 158 and 160 by a comparison of the currents in the corresponding lines 208 and 210. When the switches 217, 236, 238 are open, these currents start to flow in the portions 218 and 220 to make them conductive. However, the current mirrors of the two portions are not activated at the same speed, but the current mirror connected to the line with higher conductance (larger current) is made conductive more quickly. Upon the assumption, for example, that the current in the line 208 (positive synapses) is greater than that in the line 210 (negative synapses), the transistors 224, 226 are activated more quickly than the transistors 230, 232. Since the current flowing in the line 208 and mirrored in the line 210 is greater than that required in the latter, the excess current flows through the transistor 222. After a short transient phenomenon caused by the turning-on of the transistor 232, in the steady state, practically all of the current required by the lines 208, 210 is supplied by the portion connected to the line with the greater current (the portion 218 in the example) whereas the other portion is practically switched off.

When the enabling signal EN cuts off the transistor 236, the transistor 240, the gate terminal of which is connected to the active portion 218, and hence to the supply terminal Vdd, is made conductive, connecting the output 166 to the earth terminal (logic level 0). If, on the other hand, the current in the line 210 (negative synapses) is greater than that in the line 208 (positive synapses), the portion 220 and the transistor 238 are conducting, while the portion 218 and the transistor 240 are cut off so that the output 166 is connected to the supply terminal Vdd through the transistor 238 (logic level 1). The value output on the line 166 is stored in a suitable memory element (not shown in the drawing) and the computation in the neuron 154 is then interrupted.

It should be noted that the computation time of each neuron depends upon the intensity of the current in the portions 218 and 220 and upon their difference since larger currents reduce the activation times of the portions 218, 220 and hence the computation time of the neuron 154. Since the computation time of each neuron cannot be predicted a priori, it is fixed at a value high enough to ensure correct computation in the various operative situations. In a preferred embodiment of the present invention, the neuron 154 also includes a logic block (not shown in the drawing) for automatically timing the computation of the neuron 154. In particular, when the enabling signal EN cuts off the transistor 236, the voltage at the drain terminals of the transistors 238 and 240 starts to be unbalanced until it is brought to a value Vdd at one of them and to a value 0V at the other. As soon as the voltage of the terminal which is being brought towards logic level 1 (Vdd) exceeds a threshold voltage corresponding to that value (for example, 2.5 V) and the voltage of the terminal which is being brought towards logic level 0 (0V) falls below a threshold voltage corresponding to that value, (for example 0.8V), the computation in the neuron 154 is interrupted.

The calculation cycle of the electronic device is completed as soon as the last active neuron has completed the computation. This advantageously increases the speed of the electronic device and reduces its power consumption.

Figure 3:
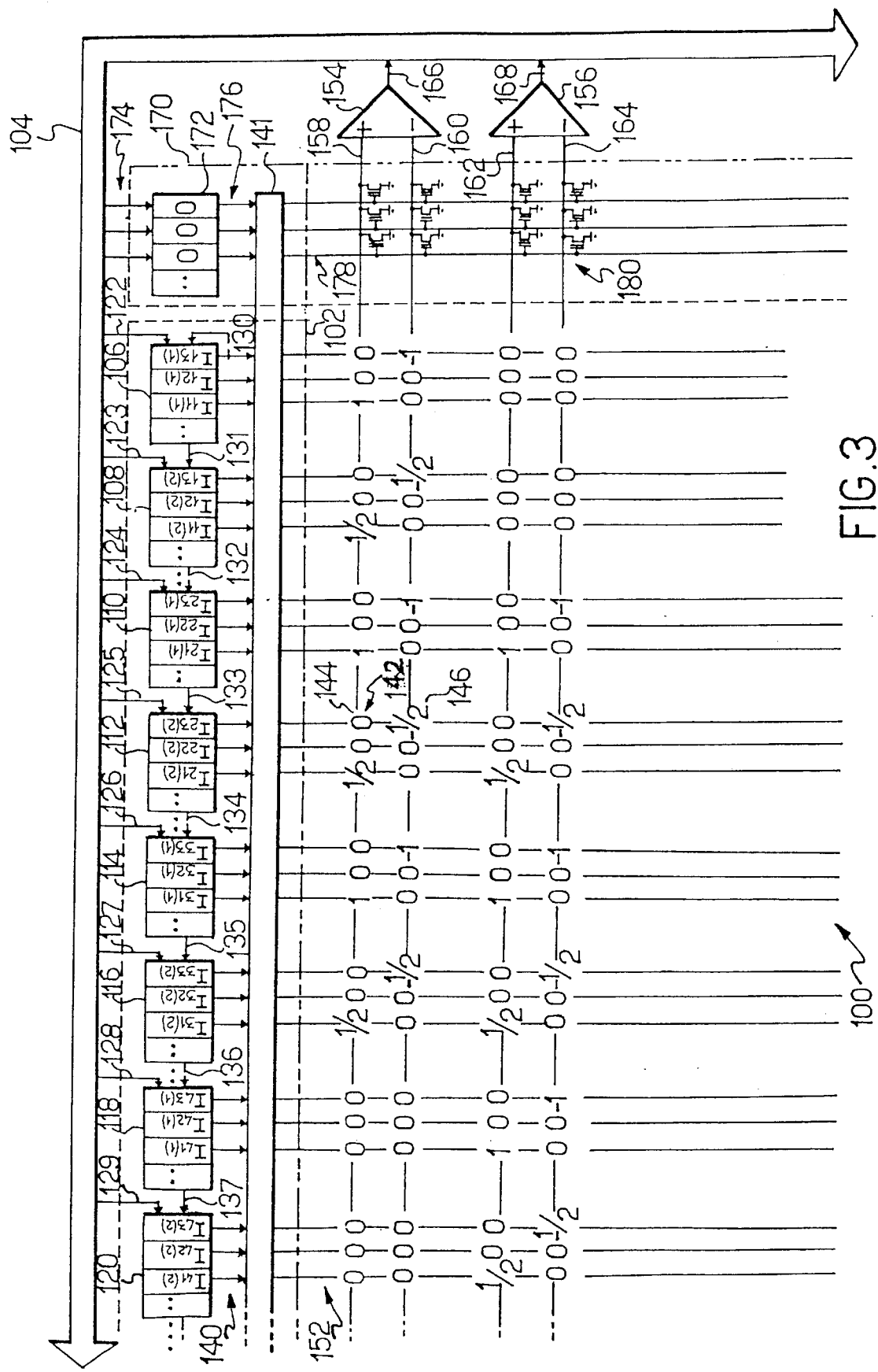
FIG. 3 shows an example of the operation of the electronic device of FIG. 1.

To describe the operation of the electronic device according to the present invention, reference will be made to the example of convolution between an original matrix and a mask matrix shown in FIG. 3 (the elements already shown in FIG. 1 are identified by the same reference numerals). For simplicity of description, the unbalancing block 170 is considered inactive (contents of memory elements 172 equal to 0). The original matrix is provided by N lines and M columns (for example 512 lines by 384 columns). Each element $I_{i,j}$ of the original matrix is represented by a number L of bits (depth) which may even be a single bit. $I_{i,j(1)}$ indicates the most significant bit (MSB) of the element $I_{i,j}$, $I_{i,j(2)}$ indicates the second most significant bit (MSB-1), and so on up to $I_{i,j(L)}$ which represents the least significant bit (LSB). For simplicity of description, it is assumed that the following Prewitt operator with 3 lines and 3 columns is used as a mask matrix:

| | | |
|---|---|---|
| 1 | 0 | −1 |
| 1 | 0 | −1 |
| 1 | 0 | −1 |

Those of skill in the art will appreciate, however, that the electronic device according to the present invention can be used with larger masks, for example, such as of 32 lines by 32 columns.

The original matrix is scanned, typically from the top left-hand corner (element $I_{1,1}$) to the bottom right-hand corner (element $I_{N,M}$) and its elements are loaded into the input unit 102. In particular, the most significant bits (MSB) of the first line are loaded into the shift register 106. These data are inserted in one column after another (from left to right) displacing the pre-existing data in the shift register 106 (towards the left) until a number of columns equal to that of the mask matrix, that is 3 in the example in question, has been inserted. Similarly, the second most significant bits (MSB-1) of the first line are loaded into the shift register 108, and so on, until its least significant bits (LSB) have been inserted. Similarly, the elements of the second line of the original matrix are loaded in the shift registers 110, 112, etc., those of the third line in the shift registers 114, 116, etc., those of the fourth line in the shift registers 118, 120, etc., and so on.

The number of lines of the original matrix loaded in parallel into the input unit 102 is at least equal to the number of lines of the mask matrix, that is, 3 in the example illustrated. The loading of further lines advantageously increases the degree of parallelism of the convolution operation (in the case of a matrix of synapses with more than one line) as described in detail below.

Weights equal to the elements of the first line of the mask matrix are stored in the synapses of the first line connected to the first 3 cells of the shift register 106. The positive values are stored in the positive synapses, whereas the negative values are stored in the negative synapses. When one synapse (positive/negative) is programmed, the other corresponding synapse is set at 0. Similarly, weights equal to halved values of the elements of the first line of the mask matrix are stored in the synapses of the first line connected to the first 3 cells of the shift register 108 so as to take account correctly of the value of the bits (MSB-1) loaded into the shift register 108, and so on, up to the synapses connected to the shift register in which the least significant bits (LSB) of the first line of the original matrix are loaded. Similarly, weights correlated with the elements of the second line of the mask matrix are stored in the synapses of the first line connected to the cells of the shift registers 110, 112, etc., and weights correlated with the elements of the third line are stored in the synapses connected to the cells of the shift registers 114, 116, etc.

The other synapses of the first line which are not necessary for storing weights correlated with the mask matrix are programmed at 0 so that the values present in the shift registers in columns which are not used for the mask matrix do not make any uncontrolled contribution to the result. The neuron 154 connected to the first line of synapses thus outputs the first result of the first line ($C_{1,1}$) of the convolution operation on the bus 104.

In the preferred embodiment shown in the drawing, weights correlated with the mask matrix are also stored in the synapses of the second line in the same way as described above but so as to disregard the first line of the original matrix. In particular, weights correlated with the elements of the first line of the mask matrix are stored in the synapses of the second line connected to the cells of the shift registers 110, 112, etc., weights correlated with the elements of the second line are stored in the synapses connected to the cells of the shift registers 114, 116, etc., and weights correlated with the elements of the third line are stored in the synapses connected to the cells of the shift registers 118, 120, etc. The other synapses of the second line are programmed at 0. Thus, it is as if the mask matrix had been moved downwards by one line relative to the original matrix.

The neuron 156 connected to the second line of synapses thus outputs the first result of the second line ($C_{2,1}$) of the convolution operation on the bus 104. By repeating the process, a third line of synapses corresponding to a third neuron (not shown in the drawing) is programmed appropriately so as to store weights correlated with the mask matrix moved downwards by two lines, and so on. The maximum degree of parallelism (MaxPar) obtainable, if T is the total number of neurons, L is the depth of the original matrix, and P is the number of lines of the mask matrix, is given by the formula:

$$MaxPar=INT(T/L)-P+1$$

For example, upon the assumption of the use of a device with T=264 neurons and an original matrix in which each element is represented by 5 bits (L=5), the maximum degree of parallelism obtainable is INT(264/5)−3+1=50. The lines of the original matrix are thus scanned from left to right producing the result of the first MaxPar lines of the convolution operation in parallel. Once the insertion of the last column of the original matrix is complete, a shift by a number of lines equal to the value of MaxPar takes place and the process starts again from the first column of the new lines. The convolution operation is completed after the last column of the last line has been processed.

That which is claimed is:

1. An electronic device for performing a convolution operation between an original matrix and a mask matrix, comprising:

a plurality of shift registers each comprising a plurality of cells for receiving binary input values representative of the original matrix;

a matrix of synapses having a plurality of columns and at least one line for storing weights correlated with the mask matrix, the synapses of each column being connected to a corresponding cell to receive the binary value contained in the cell as an input and to output a weighted value dependent upon the product of the binary value and the weight stored, each synapse having a substantially zero conductance for a first binary value and a conductance correlated with the weight stored for a second binary value;

at least one neuron connected to the synapses of a corresponding line to receive a sum of the weighted values of the synapses of the corresponding line as an input and to output a binary result dependent upon the sum, each neuron comprising conductance-measurement means for generating the binary result in dependence on a total conductance of the synapses of the corresponding line;

wherein each synapse comprises a positive synapse and a negative synapse formed as memory cells which can store a positive weight and a negative weight, respectively; and wherein said conductance-measurement means generates the binary result in dependence on a comparison between a total conductance of the positive synapses and a total conductance of the negative synapses of the corresponding line; and wherein each memory cell has a first terminal, a second terminal and a control terminal; wherein the first terminal of each memory cell is connected to a reference terminal; wherein the control terminals of the memory cells of each column are connected to the corresponding cells of the shift registers; wherein the second terminals of the memory cells providing the positive synapses and the negative synapses of each line are connected to a first input line and to a second input line to the corresponding neuron, respectively; and wherein the total conductance of the positive synapses and of the negative synapses of the line are substantially equal to the conductance of the first line and of the second line, respectively.

2. An electronic device according to claim 1, wherein each memory cell comprises a flash EEPROM memory cell including a floating-gate field-effect transistor having a threshold voltage correlated with the absolute value of the positive or negative weight stored, respectively.

3. An electronic device according to claim 2, further comprising translator means interposed between the shift registers and the memory cells for translating the first and second binary values into first and second voltage levels, respectively; wherein the threshold voltage correlated with a zero weight is greater than the second voltage level and the threshold voltage correlated with a weight other than zero is between the first and second voltage levels.

4. An electronic device according to claim 1, further comprising means for selectively activating each of the neurons.

5. An electronic device according to claim 1, further comprising means for automatically timing the computation of each neuron.

6. An electronic device according to claim 5, wherein each of the neurons has a first output and a second output; and wherein the means for automatically timing comprises means for terminating the computation of the neuron when one of the outputs has a value below a first threshold value corresponding to the first binary value and the other output has a value greater than a second threshold value corresponding to the second binary value.

7. An electronic device according to claim 6, further comprising means for terminating a computation cycle of the device when all of the neurons have terminated the computation.

8. An electronic device according to claim 1, wherein the shift registers are selectively connectable to one another to vary the number and length thereof.

9. An electronic device according to claim 1, further comprising unbalancing means for modifying the total conductance of the positive synapses and of the negative synapses of each line in a predetermined manner.

10. An electronic device according to claim 9, wherein the unbalancing means comprise at least one memory element for receiving a binary enabling value as an input and at least one further memory cell; and wherein the first terminal, the second terminal and the control terminal of each further memory cell are connected, respectively, to the reference terminal, to a corresponding memory element, and to a corresponding one of the first and second lines.

11. An electronic device according to claim 10, further comprising translator means interposed between each further memory cell and the corresponding memory element.

12. An electronic device for performing a convolution operation between an original matrix and a mask matrix, comprising:
   a plurality of shift registers each comprising a plurality of cells for receiving binary input values representative of the original matrix;
   a matrix of synapses having a plurality of columns and at least one line for storing weights correlated with the mask matrix, the synapses of each column being connected to a corresponding cell to receive the binary value contained in the cell as an input and to output a weighted value dependent upon the product of the binary value and the weight stored, each synapse having a first conductance for a first binary value and a second conductance correlated with the weight stored for a second binary value, each synapse comprising a positive synapse and a negative synapse formed as memory cells, which can store a positive weight and a negative weight, respectively;
   at least one neuron connected to the synapses of a corresponding line to receive a sum of the weighted values of the synapses of the corresponding line as an input and to output a binary result dependent upon the sum, each neuron comprising conductance-measurement means for generating the binary result in dependence on a comparison between a total conductance of the positive synapses and a total conductance of the negative synapses of the corresponding line;
   wherein each memory cell has a first terminal, a second terminal and a control terminal; wherein the first terminal of each memory cell is connected to a reference terminal; wherein the control terminals of the memory cells of each column are connected to the corresponding cells of the shift registers; wherein the second terminals of the memory cells providing the positive synapses and the negative synapses of each line are connected to a first input line and to a second input line to the corresponding neuron, respectively; and wherein the total conductance of the positive synapses and of the negative synapses of the line are substantially equal to the conductance of the first line and of the second line, respectively.

13. An electronic device according to claim 12, wherein each memory cell comprises a flash EEPROM memory cell including a floating-gate field-effect transistor having a threshold voltage correlated with the absolute value of the positive or negative weight stored, respectively.

14. An electronic device according to claim 13, further comprising translator means interposed between the shift registers and the memory cells for translating the first and second binary values into first and second voltage levels, respectively; wherein the threshold voltage correlated with a zero weight is greater than the second voltage level and the threshold voltage correlated with a weight other than zero is between the first and second voltage levels.

15. An electronic device according to claim 12, further comprising means for selectively activating each of the neurons.

16. An electronic device according to claim 12, further comprising means for automatically timing the computation of each neuron.

17. An electronic device according to claim 16, wherein each of the neurons has a first output and a second output; and wherein the means for automatically timing comprises means for terminating the computation of the neuron when one of the outputs has a value below a first threshold value corresponding to the first binary value and the other output has a value greater than a second threshold value corresponding to the second binary value.

18. An electronic device according to claim 17, further comprising means for terminating a computation cycle of the device when all of the neurons have terminated the computation.

19. An electronic device according to claim 12, wherein the shift registers are selectively connectable to one another to vary the number and length thereof.

20. An electronic device according to claim 12, further comprising unbalancing means for modifying the total conductance of the positive synapses and of the negative synapses of each line in a predetermined manner.

21. An electronic device according to claim 20, wherein the unbalancing means comprise at least one memory element for receiving a binary enabling value as an input and at least one further memory cell; and wherein the first terminal, the second terminal and the control terminal of each further memory cell are connected, respectively, to the reference terminal, to a corresponding memory element, and to a corresponding one of the first and second lines.

22. An electronic device according to claim 21, further comprising translator means interposed between each further memory cell and the corresponding memory element.

23. An electronic device according to claim 21, wherein the first conduction for the first binary value is substantially zero conduction.

24. A method for performing a convolution operation between an original matrix and a mask matrix, the method comprising the steps of:
   providing a plurality of shift registers each comprising a plurality of cells, and receiving binary input values representative of the original matrix in said cells;

providing a matrix of synapses having a plurality of columns and at least one line for storing weights correlated with the mask matrix, the synapses of each column being connected to a corresponding cell and receiving the binary value contained in the cell as an input and outputting a weighted value dependent upon the product of the binary value and the weight stored, each synapse having a first conductance for a first binary value and a second conductance correlated with the weight stored for a second binary value, wherein each synapse comprises a positive synapse and a negative synapse which can store a positive weight and a negative weight, respectively; and wherein the step of outputting the binary result comprises generating the binary result in dependence on a comparison between a total conductance of the positive synapses and a total conductance of the negative synapses of the corresponding line;

connecting at least one neuron to the synapses of a corresponding line and receiving a sum of the weighted values of the synapses of the corresponding line as an input and outputting a binary result dependent upon the sum; and automatically timing the computation of each neuron.

25. A method according to claim 24, wherein each of the neurons has a first output and a second output; and wherein the step of automatically timing comprises terminating the computation of the neuron when one of the outputs has a value below a first threshold value corresponding to the first binary value and the other output has a value greater than a second threshold value corresponding to the second binary value.

26. A method according to claim 25, further comprising the step of terminating a computation cycle of the device when all of the neurons have terminated the computation.

27. A method according to claim 24, further comprising the step of modifying the total conductance of the positive synapses and of the negative synapses of each line in a predetermined manner.

28. A method according to claim 24, wherein the first conduction for the first binary value is substantially zero conduction.

* * * * *